H. T. THOMAS.
AUTOMOBILE CONSTRUCTION.
APPLICATION FILED FEB. 25, 1921.

1,383,880.

Patented July 5, 1921.
3 SHEETS—SHEET 1.

INVENTOR
HORACE T. THOMAS
BY   ATTORNEY
Ralzemond A. Parker

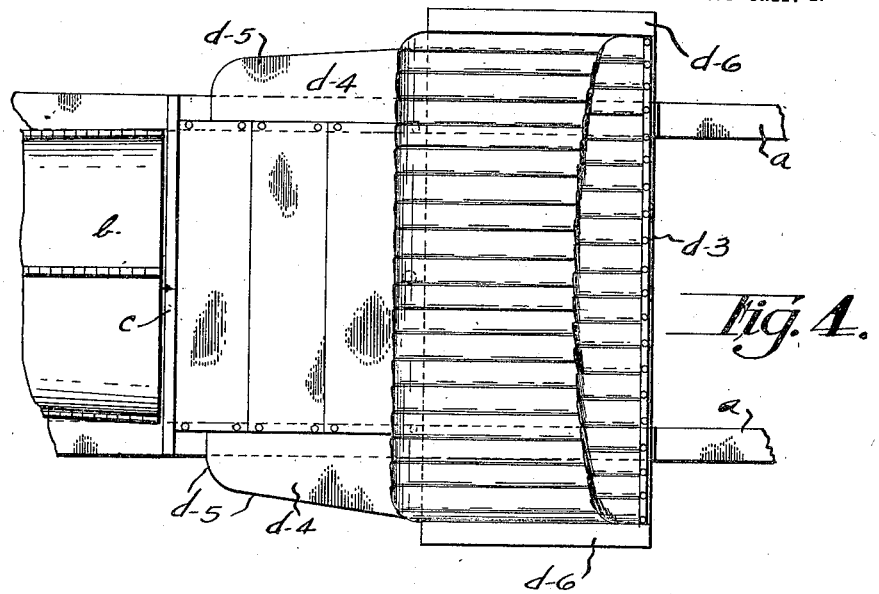
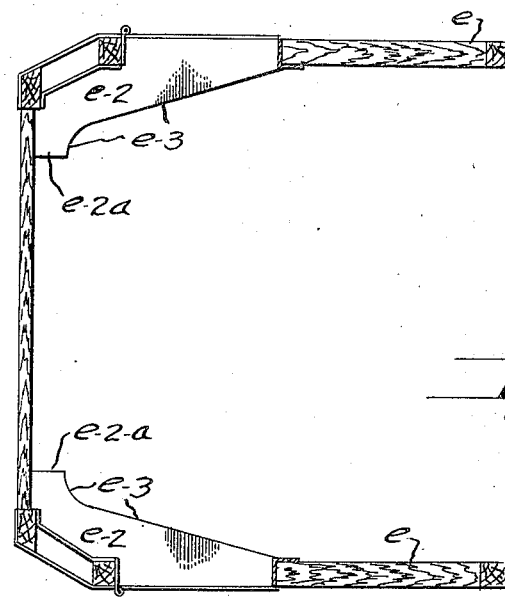

H. T. THOMAS.
AUTOMOBILE CONSTRUCTION.
APPLICATION FILED FEB. 25, 1921.

1,383,880.

Patented July 5, 1921.
3 SHEETS—SHEET 3.

INVENTOR
HORACE T. THOMAS
BY  ATTORNEY
Ralzemond A. Parker

UNITED STATES PATENT OFFICE.

HORACE T. THOMAS, OF LANSING, MICHIGAN.

AUTOMOBILE CONSTRUCTION.

1,383,880. Specification of Letters Patent. Patented July 5, 1921.

Application filed February 25, 1921. Serial No. 447,813.

*To all whom it may concern:*

Be it known that I, HORACE T. THOMAS, citizen of the United States, residing at Lansing, county of Ingham, State of Michigan, have invented a certain new and useful Improvement in Automobile Constructions, and declare the following to be a full, clear, and exact description of the same, such as will enable others skilled in the art to which it pertains to make and use the same, reference being had to the accompanying drawings, which form a part of this specification.

My invention relates to automobile construction and an object of my improvements is to facilitate and cheapen the construction and assembly of certain parts adapted particularly for a commercial vehicle.

In the accompanying drawings:

Fig. 4 is a plan view of the construction of Fig. 1 with the part shown in Fig. 2 removed.

Fig. 5 is a sectional view of Fig. 2, the section being taken on the line V—V, Fig. 2.

To facilitate the assembly as well as the convenient construction of the parts I make a separate unit of the top and of the seat. These are formed to fit into each other in assembling so as to form a strong and firm construction when bolted to the chassis.

$a$ $a$ are the side pieces of the chassis. $b$ is the casing inclosing the motor. $c$ is the dash or instrument board.

$d$ $d$ is the seat construction. This is formed with two horizontal base pieces $d^4$ $d^4$ of the frame. $d^3$ is the back frame which joins the rear ends of the horizontal pieces $d^4$ $d^4$. The seat proper is built upon the frame pieces $d^3$ $d^4$ $d^4$ in the usual way and is provided with two side pieces $d^e$. $d^6$ $d^6$ are side pieces joined to the back pieces $d^3$ and the base pieces $d^4$ at each side. The outer and forward edges of the base pieces $d^4$ $d^4$ are chamfered and cut inward as shown at $d^5$, Fig. 4.

Figure 1:
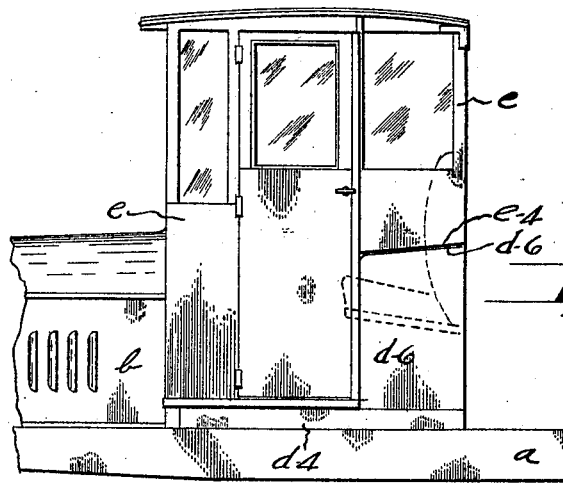
Figure 1 is a side view of a construction embodying my invention and so much of an automobile as is necessary to illustrate its connection therewith.
Figures 2, 3:
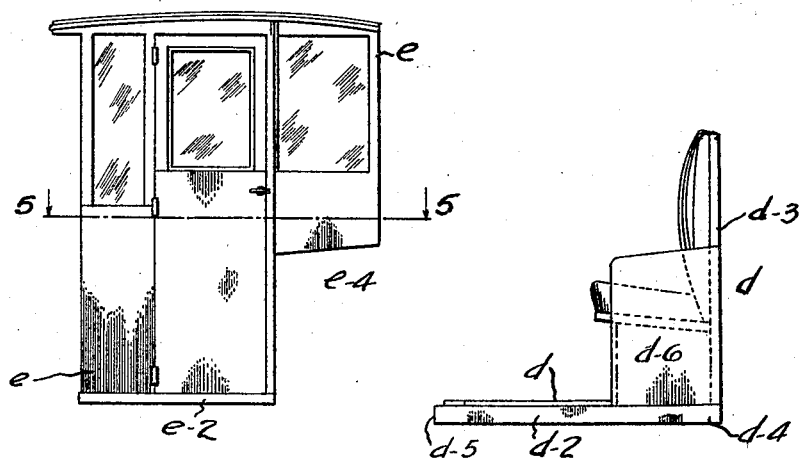
Fig. 2 is an integral part of the construction of Fig. 1 separated from the other parts.
Fig. 3 is a second part of said construction shown by itself in side elevation.
Figure 6:
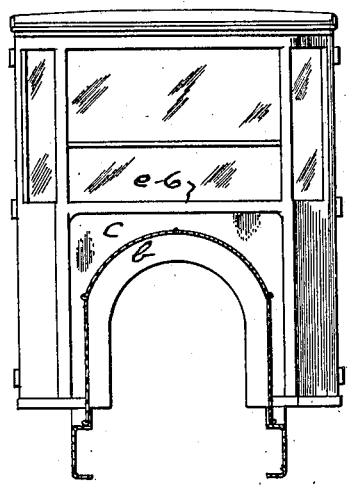
Fig. 6 is a front elevation of the construction shown in Fig. 1.
Figure 7:
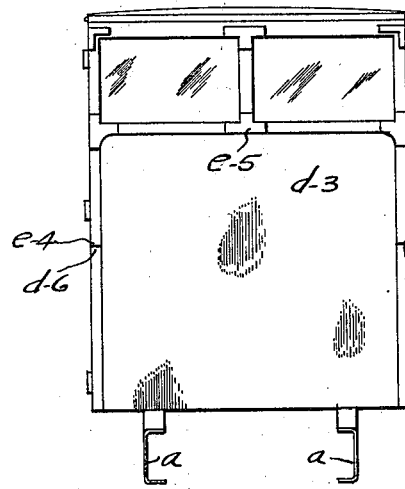
Fig. 7 is a rear elevation of the same.

$e$ is the top or inclosure. This is provided with base or side pieces $e^2$ cut away as shown at $e^3$, Fig. 5, to fit against the edges $d^5$ of the base pieces $d^4$ $d^4$. The top $e$ is also formed to rest upon the upper edges of the side pieces $d^6$ of the seat portion as shown at $e^4$. The forward part of the top $e$ is shaped to fit around and rest upon the dash or instrument board $c$ as shown at $e^6$, Fig. 6, and the rear portion of said top is formed to fit around and rest upon the back $d^3$ on the seat as shown at $e^5$. The method of assembling the above described parts is as follows:

The seat $d$ is first put in place. The base pieces $d^4$ resting upon the side pieces $a$ $a$ of the frame with their edges $d^5$ outward. These may be secured in place by bolts, or otherwise. The top portion $e$ is then placed over the seat portion $d$; the edges $e^4$ $e^4$ resting upon the upper edges of the side pieces $d^6$ $d^6$, the edge $e^5$ of the back of the top resting upon the top of the back $d^3$ of the seat as shown in Fig. 7, the part $e^6$ (Fig. 6) resting upon the top edge of the instrument board $c$. The edges $e^3$ $e^3$ of the frame pieces $e^2$ $e^2$ fitting against the edges $d^5$ of the base pieces $d^4$ $d^4$ and the inner ends $e^{2a}$ of the pieces $e^2$ $e^2$ resting upon the side pieces $a$ $a$ of the chassis. These may be bolted to the chassis.

This construction enables the separate parts to be easily made, they being more accessible as separate parts than as an assembly. They are easily and neatly assembled and fitted together and are rigidly and securely held in place upon the vehicle.

What I claim is:

1. In a vehicle, the combination of a chassis, a seat construction forming an integral unit adapted to be removably secured to said chassis, a top construction forming an integral unit adapted to be secured to said chassis and said seat construction in place upon the chassis.

2. In a vehicle, the combination of a chassis, a seat construction forming an integral unit adapted to be removably secured to said chassis, a top construction forming an integral unit adapted to be secured to said chassis and said seat construction in place upon the chassis, the seat construction being provided with base pieces $d^4$ $d^4$ having shaped outer and forward edges, the top construction being provided with frame pieces $e^2$ $e^2$ having inner edges adapted to fit against the outer edges of the base pieces $d^4$ $d^4$ of the seat.

3. In a vehicle, the combiantion of a chassis, a seat construction forming an integral unit adapted to be removably secured to said chassis, a top construction forming an integral unit adapted to be secured to said chassis and said seat construction in place upon the chassis, said top construction being adapted to fit against and upon the side pieces, and back of the seat.

4. In a vehicle, the combination of a chassis, a seat construction forming an integral unit adapted to be removably secured to said chassis, a top construction forming an integral unit adapted to be secured to said chassis and said seat construction in place upon the chassis, said top construction being adapted to fit against and upon the side pieces, and back of the seat, said top being adapted to fit against and rest upon the dash or instrument board.

In testimony whereof I sign this specification.

HORACE T. THOMAS.